United States Patent [19]

Kishigami

[11] Patent Number: 5,689,352

[45] Date of Patent: Nov. 18, 1997

[54] LIQUID CRYSTAL DISPLAY DEVICE AND PROCESS FOR PRODUCING SAME

[75] Inventor: Masamitsu Kishigami, Kokubunji, Japan

[73] Assignee: Casio Computer Co., Ltd., Tokyo, Japan

[21] Appl. No.: 491,318

[22] Filed: Jun. 16, 1995

[30] Foreign Application Priority Data

Jun. 21, 1994 [JP] Japan ..................... 6-160772

[51] Int. Cl.[6] ...................... G02F 1/1333; G02F 1/1345; G02F 1/13
[52] U.S. Cl. ................................................ 359/88
[58] Field of Search ..................... 359/59, 76, 88; 257/452, 457; 361/56, 58, 91, 111

[56] References Cited

U.S. PATENT DOCUMENTS

| | | | |
|---|---|---|---|
| 5,200,847 | 4/1993 | Mawatari | 359/59 |
| 5,233,448 | 8/1993 | Wu | 359/88 |
| 5,276,541 | 1/1994 | Terada et al. | 359/88 |
| 5,289,336 | 2/1994 | Gagliano | 359/62 |
| 5,467,210 | 11/1995 | Kishigami | 359/88 |
| 5,504,348 | 4/1996 | Yoshida et al. | 359/59 |

FOREIGN PATENT DOCUMENTS 6-202152  7/1994  Japan ............................... 359/59

*Primary Examiner*—William L. Sikes
*Assistant Examiner*—Ron Trice
*Attorney, Agent, or Firm*—Frishauf, Holtz, Goodman, Langer & Chick

[57] ABSTRACT

A plurality of conductive lines are formed on a lower base plate. One surface of the lower base plate is divided into a first portion which is to be formed into a lower substrate, and a second portion. The first portion includes a first area which is to be covered with an upper substrate, and a second area. The conductive lines are extended from the first area of the first portion to the second portion through the second area of the first portion. A connecting pattern is formed on the second portion, and is connected to each of the conductive lines. Thereafter, an orientation film is formed on the first area of the first portion. Then, the surface of an orientation film is rubbed in an orientation process. During the orientation process, electric charges which are generated in each of the conductive lines by friction, flow to the connecting pattern immediately. Therefore, the conductive lines and the orientation film are protected from the electric charges, and damage is avoided.

29 Claims, 7 Drawing Sheets

LIQUID CRYSTAL DISPLAY DEVICE AND PROCESS FOR PRODUCING SAME

BACKGROUND OF THE INVENTION

1. Field of the Invention

The present invention relates to a liquid crystal display device and a process for producing the device.

2. Description of the Prior Art (Related Art)

Generally, a liquid crystal display device comprises two transparent substrates, which are arranged to face each other and a sealing member, which is in the shape of a frame and arranged between the substrates so that the substrates are bonded to each other by the sealing member. The substrates include display areas on each confronted surfaces thereof. The sealing member surrounds the display areas of the substrates. A liquid crystal material is injected in a cavity defined by the substrates and the sealing member, and is sealed therein. Transparent electrodes and an orientation film are formed on each of the display areas of the substrates.

In a process for producing an example of the liquid crystal display device described above, a plurality of display elemental devices are formed on the display area of one of the substrates. A plurality of conductive lines are formed on the surface of the substrate, which surface includes the display area. The conductive lines are connected respectively to the display elemental devices. A transparent electrode made of ITO (indium tin oxide) is connected to each of the display elemental devices.

An orientation film made of resin such as polyimide is formed on the display area of the substrate so that the orientation film covers the display elemental devices, the transparent electrodes, portions of the conductive lines which are on the display area. Then the substrate is laid on a table of a rubbing equipment and is subjected to an orientation process. In the orientation process, a surface of the orientation film is rubbed in a predetermined direction by a nappy cloth wound around a roll of the rubbing equipment. As a result, the surface of the orientation film is to orient molecules of the liquid crystal material in the direction.

During the orientation process described above, friction between the nappy cloth and the orientation film generates static electricity on the surface of the orientation film. At this time, the quantity of electric charges generated in each conductive lines differs from each other, so that a voltage difference occurs between the conductive lines which adjoin each other, according to circumstances. In this case, electricity is discharged between the conductive lines and a large amount of electric current flows through the conductive lines. As a result, the conductive lines are damaged and a portion of the orientation film which is located between the conductive lines is broken.

Therefore, a process for producing a liquid crystal display device which process overcomes the above defect has been developed. FIG. 6 is a view showing, by way of example, the liquid crystal display device produced by such process and FIG. 7 is a view showing a part of a lower base plate to be subjected to the process.

The liquid crystal display device of FIG. 6 includes a liquid crystal display panel 1, two semiconductor chips (driving devices) 2 and 3, and a flexible circuit board 4. The liquid crystal display panel 1 comprises two transparent upper and lower substrates 5 and 6, which are arranged to face each other and a sealing member 7 which is in the shape of a frame and arranged between the substrates 5 and 6 so that the substrates 5 and 6 are bonded to each other by the sealing member 7. The substrates 5 and 6 include display areas 8 on each of the confronted surfaces thereof. The sealing member 7 surrounds the display areas 8 of the substrates 5 and 6. A liquid crystal material (not shown) is injected in a cavity defined by the substrates 5 and 6 and the sealing member 7, and is sealed therein. A transparent electrode and an orientation film are formed on the display area 8 of the upper substrate 5 wherein the orientation film covers the transparent electrode. A plurality of TFTs (thin film transistors) as display elemental devices are formed on the display area 8 of the lower substrate 6. A plurality of conductive lines 13 and 14 are formed on the surface of the lower substrate 6, which surface includes the display area 8. The conductive lines 13 and 14 are connected respectively to the TFTs. Transparent electrodes are formed on the display area 8 of the lower substrate 6. The transparent electrodes are connected respectively to the TFTs. An orientation film is formed on the display area 8 of the lower substrate 6 so that the orientation film covers the TFTs, the transparent electrodes, and portions of the conductive lines 13 and 14 which portions are on the display area 8. The size of the lower substrate 6 is larger than that of the upper substrate 5. When the upper substrate 5 is mounted on the lower substrate 6 in an overlapping manner with the two adjacent sides thereof met with the corresponding adjacent sides of the lower substrate 6, then portions 9 and 10 of the lower substrate 6 which are not covered with the upper substrate 5 can be seen when viewed from the top, as shown in FIG. 6. A plurality of other conductive lines 15 and 16 are formed on the portions (extended portions) 9 and 10 of the lower substrate 6 respectively. The semiconductor chips 2 and 3 are mounted on the extended portions 9 and 10 respectively.

Plural input connecting bumps (input terminals) for receiving a control signal and a power source, and plural output connecting bumps (output terminals) for sending a drive signal are formed on a lower surface of the semiconductor chips 2 and 3. The input connecting bumps are electrically connected to the conductive lines 15 and 16 through an anisotropic conductive adhesive. The output connecting bumps are electrically connected to the conductive lines 13 and 14 through the anisotropic conductive adhesive.

The flexible circuit board 4 is formed into an L-shape. Plural connecting lines 19 are formed on a lower surface of the flexible circuit board 4. The flexible circuit board 4 is linked to the extended potions 9 and 10 of the lower substrate 6. First end portions of the connecting lines 19 are electrically connected to the conductive lines 15 and 16 through another anisotropic conductive adhesive. Hereupon, one group of the connecting lines 19 are connected to the conductive lines 15 at one portion of the lower substrate 6, and another group of the connecting lines 19 are connected to the conductive lines 16 at another portion thereof. Therefore, the bonding work for linking the flexible circuit board 4 to the lower substrate 6 is performed two times. The other end portions of the connecting lines 19 are electrically connected to conductive lines of a control circuit board (not shown).

In the process for producing the liquid crystal display device described above, as shown in FIG. 7, one surface of a lower transparent base plate 20, which is to be made into the lower substrate 6 is divided into two portions which are a formative portion 21 and an unformative portion 22. The formative portion 21 corresponds to the lower substrate 6 and is to be formed into the substrate 6. The formative portion 21 includes the display area 8 and two mount areas 11 and 12 on which the semiconductor chips 2 and 3 are to be mounted respectively. The TFTs and the transparent electrodes are formed on the display area 8. The conductive lines 13 and 14 are formed on the formative portion 21. The other conductive lines 15 and 16 are formed on the formative portion 21. Connecting patterns 23 and 24 which are connected to each other are formed on the unformative portion 22. Extended conductive lines 17 and 18 are formed on the surface including the formative portion 21 and the unformative portion 22. First end portions of the conductive lines 17 and 18 are connected to the conductive lines 13 and 14 respectively. The other end portions of the conductive lines 17 and 18 are connected to the connecting patterns 23 and 24 respectively. Hence, the conductive lines 13 and 14 are connected to the connecting patterns 23 and 24 through the conductive lines 17 and 18 respectively. Then, the orientation film is formed on the display area 8.

Thereafter, the base plate 20 is laid on the table of the rubbing equipment and is subjected to the orientation process described above. During the orientation process, the electric charges generated in each of the conductive lines 13 and 14 flow to the connecting patterns 23 and 24 through the conductive lines 17 and 18 immediately. Therefore, a voltage difference does not occur between adjacent ones of the conductive lines 13 and 14. As a result, the conductive lines 13 and 14 are not damaged and a portion of the orientation film which is located between the adjacent conductive lines 13 and 14 is not broken.

Then, an upper base plate (not shown), which is to be formed into the upper substrate 5, is bonded to the base plate 20 by the sealing member 7. The upper base plate is cut along an outer peripheral line of the sealing member 7 so that the upper substrate 5 is formed. The base plate 20 is cut along a boundary line between the formative portion 21 and the unformative portion 22 so that the lower substrate 6 is formed. At this time, the conductive lines 16 and 17 are also cut along the boundary line so that the conductive lines 13 and 14 are disconnected from the connecting patterns 23 and 24 respectively.

Thereafter, the liquid crystal material is injected in the cavity defined by the substrates 5 and 6, and the sealing member 7 and is sealed therein so that the liquid crystal display panel 1 is completed. The semiconductor chips 2 and 3 are mounted on the mount areas 11 and 12 respectively. The flexible circuit board 4 is linked to the lower substrate 6 of the liquid crystal display panel 1.

However, in such a conventional liquid crystal display device produced by the process described above, the conductive lines 17 and 18 are elongated to the outside of the sealing member 7. The elongated portions of the conductive lines 17 and 18 are located between the substrates 5 and 6, and are exposed at two edges of the liquid crystal display device. Foreign matter such as a conductive particle or moisture can be interposed between the substrates 5 and 6. The foreign matter once interposed therebetween cannot escape therefrom easily. In the case that the foreign matter is located between adjacent ones of the conductive lines 17 and 18, the adjacent conductive lines are short-circuited.

SUMMARY OF THE INVENTION

The present invention has been made to overcome the above drawbacks. An object of the present invention is to provide a process for producing a liquid crystal display device in which conductive lines and an orientation film are protected from electric charges, and to produce a liquid crystal display device in which adjacent conductive lines are not short-circuited.

In order to achieve the object, a first aspect of the present invention provides a liquid crystal display device comprising:

a first substrate;

a second substrate arranged to face the first substrate, the second substrate including a first portion which is covered with the first substrate, and a second portion which is not covered with the first substrate;

a plurality of display elemental devices formed on the first portion of the second substrate;

a plurality of first conductive lines formed on the second substrate, the first conductive lines being connected at ends thereof respectively to the display elemental devices and being elongated from the first portion of the second substrate to an edge of the second substrate through the second portion thereof;

a plurality of second conductive lines formed on the second portion of the second substrate;

a driving device having plural output terminals and plural input terminals for driving the display elemental devices, the driving device being mounted on the second portion of the second substrate so that the output terminals and the input terminals thereof are coupled to the first conductive lines and the second conductive lines respectively; and a liquid crystal material interposed between the first substrate and the second substrate.

A second aspect of the present invention provides a process for producing a liquid crystal display device including first and second substrates arranged to face each other and a liquid crystal material interposed therebetween, said process comprising the steps of:

providing a first base plate to be formed into the first substrate;

providing a second base plate having a first portion to be formed into the second substrate and a second portion, the first portion and the second portion being defined on one surface of the second base plate by a boundary line, and the first portion including a first area to be covered with the first substrate and a second area to be covered with the first substrate;

forming a plurality of display elemental devices on the first area of the first portion of the second base plate;

forming a conductive pattern on the second base plate, the conductive pattern including a connecting pattern and a plurality of conductive lines coupled to the connecting pattern, the connecting pattern being located on the second portion of the second base plate, and the conductive lines being extended from the connecting pattern to the first area of the first portion through the second area of the first portion so as to be connected at ends thereof respectively to the display elemental devices formed on the first area of the first portion;

forming an orientation film on the first area of the first portion of the second base plate;

subjecting the orientation film formed on the second base plate to an orientation process such that a surface of the orientation film orients molecules of the liquid crystal material in a predetermined direction;

arranging a sealing member on at least one of the first base plate and the second base plate, the sealing member forming a frame;

bonding the first base plate and the second base plate together by means of the sealing member so that the sealing member surrounds the first area of the first portion of the second base plate, wherein a cavity is defined by the first base plate, the second base plate, and the sealing member;

cutting the first base plate along an outer peripheral line of the sealing member so as to separate the first base plate into two portions by the outer peripheral line, whereby the first substrate is formed;

cutting the second base plate along the boundary line between the first portion and the second portion thereof so as to separate the first portion from the second portion by the boundary line, whereby the first portion is formed into the second substrate; and injecting the liquid crystal material into the cavity defined by the first substrate, the second substrate, and the sealing member.

A third aspect of the present invention provides a process for producing a liquid crystal display device including first and second substrates arranged to face each other and a liquid crystal material interposed therebetween said process comprising the steps of:

providing a first base plate to be formed into the first substrate;

providing a second base plate having a first portion to be formed into the second substrate and a second portion, the first portion and the second portion being defined on one surface of the second base plate by a boundary line, and the first portion including a first area to be covered with the first substrate and a second area to be covered with the first substrate;

forming a plurality of display elemental devices on the first area of the first portion of the second base plate;

forming a plurality of conductive lines on the second base plate extending from the first area of the first portion to the second portion through the second area of the first portion, the conductive lines being connected at ends thereof respectively to the display elemental devices;

forming a connecting pattern on the second portion of the second base plate, the connecting pattern being coupled to each of the conductive lines;

forming an orientation film on the first area of the first portion of the second base plate;

subjecting the orientation film formed on the second base plate to an orientation process such that a surface of the orientation film orients molecules of the liquid crystal material in a predetermined direction;

arranging a sealing member on at least one of the first base plate and the second base plate, the sealing member forming a frame;

bonding the first base plate and the second base plate together by means of the sealing member so that the sealing member surrounds the first area of the first portion of the second base plate, wherein a cavity is defined by the first base plate, the second base plate, and the sealing member;

cutting the first base plate along an outer peripheral line of the sealing member so as to separate the first base plate into two portions by the outer peripheral line, whereby the first substrate is formed;

cutting the second base plate along the boundary line between the first portion and the second portion thereof so as to separate the first portion from the second portion by the boundary line, whereby the first portion is formed into the second substrate; and injecting the liquid crystal material into the cavity defined by the first substrate, the second substrate, and the sealing member.

Additional objects, features, and advantages of the present invention will be apparent from a consideration of the following description, taken in connection with the accompanying drawings.

BRIEF DESCRIPTION OF THE DRAWINGS

Other objects and structures of the present invention will be more fully understood from the description, when taken in conjunction with the accompanying drawings in which.

DETAILED DESCRIPTION OF THE PREFERRED EMBODIMENTS

Now, preferred embodiments of a liquid crystal display device and a process for producing the device of the present invention will be described in detail with reference to the accompanying drawings.

A liquid crystal display device of the present invention comprises upper and lower transparent substrates arranged to face each other and a liquid crystal material interposed therebetween.

Figure 1:
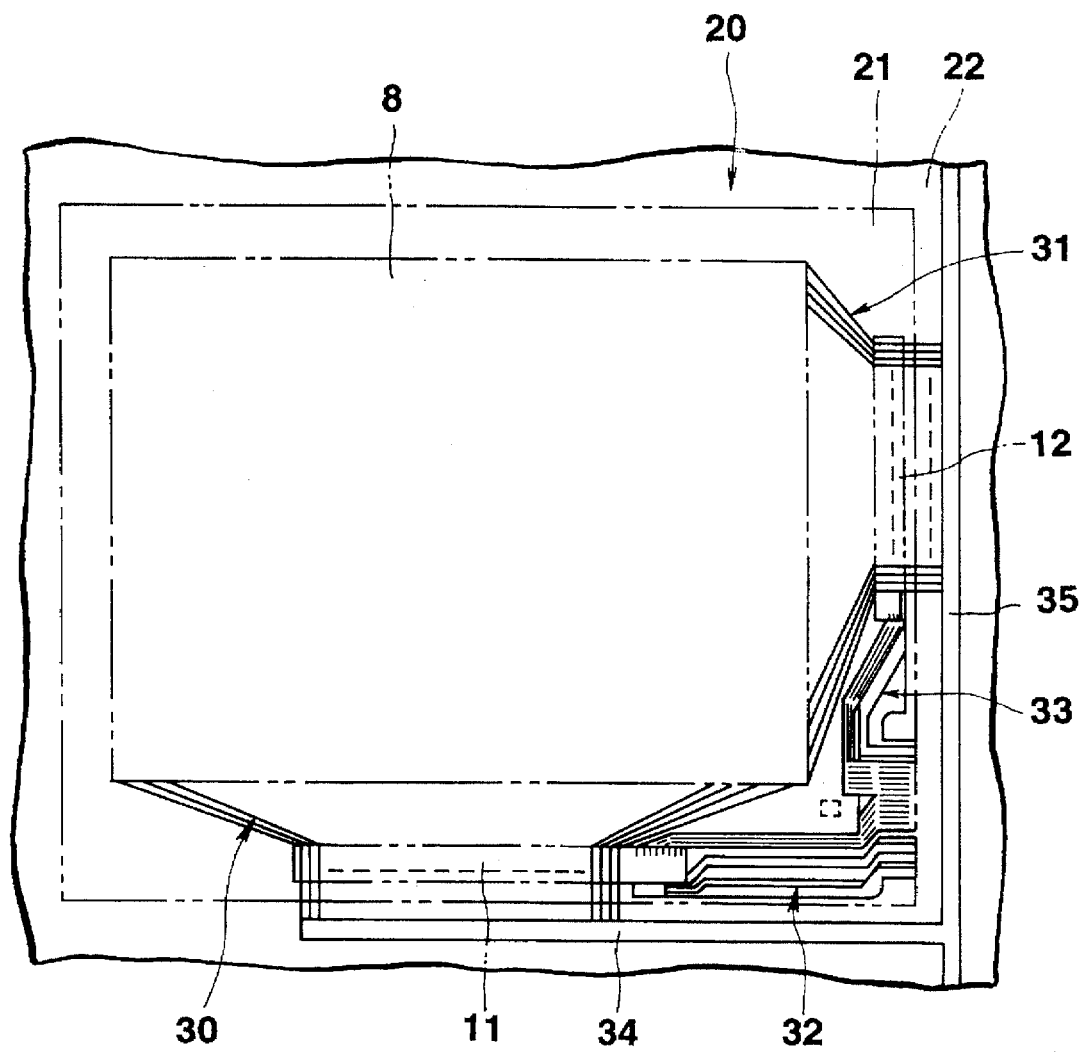
FIG. 1 is a view showing a part of a lower base plate to be subjected to a producing process of the present invention and to be formed into a lower substrate, wherein the lower substrate is included in a liquid crystal display device of the present invention.
Figure 3:
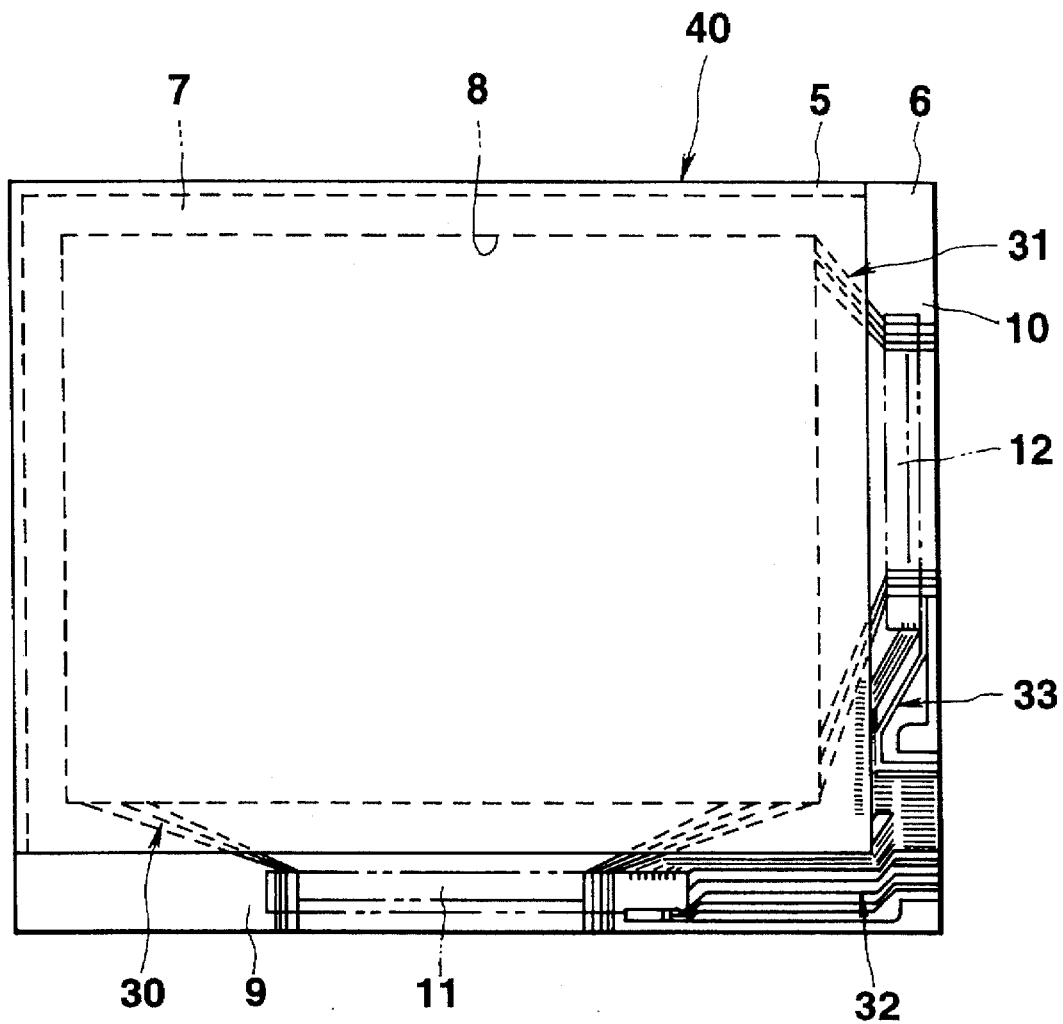
FIG. 3 is a view showing a liquid crystal display panel in the producing process of the present invention, wherein the liquid crystal display panel comprises the upper substrate and a lower substrate which is made of the lower base plate.

At the beginning of a producing process of the present invention, a lower base plate 20, which is made of glass or resin, is prepared as shown in FIG. 1. The lower base plate 20 is to be made into the lower substrate 6 which is shown in FIG. 3. One surface of the lower base plate 20 is divided into two portions which are a formative portion 21 and an unformative portion 22. The formative portion 21 corresponds to the substrate 6 and is to be formed into the substrate 6. The formative portion 21 includes a display area 8 and two mount areas 11 and 12 on which two semiconductor chips 41 and 42 (shown in FIG. 4) are to be mounted respectively.

A plurality of TFTs (thin film transistors) as display elemental devices are formed on the display area 8 of the formative portion 21. A plurality of transparent electrodes made of ITO (indium tin oxide) are formed on the display area 8 thereof. The transparent electrodes are connected respectively to the TFTs. Connecting patterns 34 and 35 which are conductive and connected to each other are formed on the unformative portion 22. A plurality of conductive lines 30 and 31 are formed on the surface of the lower base plate 20, which surface includes the display area 8. In this case, the connecting patterns 34 and 35, and the conductive lines 30 and 31 are formed on the lower base plate 20 at the same time. The conductive lines 30 and 31 are extended from the formative portion 21 to the unformative portion 22. In the formative portion 21, the conductive lines 30 are elongated from the display area 8 to a edge of the formative portion 21 through the mount area 11. Similarly, the conductive lines 31 are elongated from the display area 8 to another edge of the formative portion 21 through the mount area 12. First end portions of the conductive lines 30 and 31 are connected to respectively to the TFTs. The other end portions of the conductive lines 30 and 31 are connected to the connecting patterns 34 and 35 respectively. A plurality of other conductive lines 32 and 33 are formed on the formative portion 21. The conductive lines 32 are elongated from the mount area 11 to the edge of the formative portion 21. Similarly the conductive lines 33 are elongated from the mount area 12 to the same edge of the formative portion 21. First end portions of the conductive lines 32 and 33 are formed so as to be located in the mount area 11 and 12 respectively. The other end portions of the conductive lines 32 and 33 are formed to be connected with an external circuit at one edge of the formative portion 21.

Then, an orientation film made of resin such as polyimide is formed on the display area 8 of the formative portion 21 so that the orientation film covers the TFTs, the transparent electrodes, and portions of the conductive lines 30 and 31 which are on the display area 8. Thereafter, the lower base plate 20 is laid on a table of a rubbing equipment and is subjected to an orientation process. In the orientation process, a surface of the orientation film is rubbed in a predetermined direction by a nappy cloth wound around a roll of the rubbing equipment. As a result, the surface of the orientation film orients molecules of the liquid crystal material in a predetermined direction.

During the orientation process described above, the electric charges, which are generated in each of the conductive lines 30 and 31 of the lower base plate 20 by friction between the nappy cloth and the orientation film, flow to the connecting patterns 34 and 35 immediately. Therefore, a voltage difference does not occur between adjacent ones of the conductive lines 30 and 31. As a result, the conductive lines 30 and 31 are not damaged and a of the orientation film which portion is located between the adjacent conductive lines 30 and 31 is not broken.

In the orientation process, it is desirable that the connecting patterns 34 and 35 are earthed because the electric charges described above flow to the earth through the connecting patterns 34 and 35. Therefore, the electric charges are not kept in the connecting patterns 34 and 35. The electric charges flow away from the conductive lines 30 and 31 more efficiently. As a result the conductive lines 30 and 31, and the orientation film are protected from the electric charges generated by friction more certainly.

Then, a sealing member 7 (shown in FIG. 2) made of resin such as epoxy resin is arranged on the formative portion of the lower base plate 20. The sealing member 7 is in the shape of a frame and surrounds the display area 8. An upper base plate (not shown), which is to be formed into an upper substrate 5 (shown in FIG. 2), is bonded to the lower base plate 20 by the sealing member 7. Therefore, the upper base plate and the lower base plate 20 are arranged to face each other. A surface of the upper base plate, which surface confronts the lower base plate 20, includes a display area which corresponds to the display area 8 of the lower base plate 20. Before the upper base plate and the lower base plate 20 are bonded to each other, a transparent electrode is formed on the display area of the upper base plate, and an orientation film is formed on the display area thereof so that the orientation film covers the transparent electrode.

Figure 2:
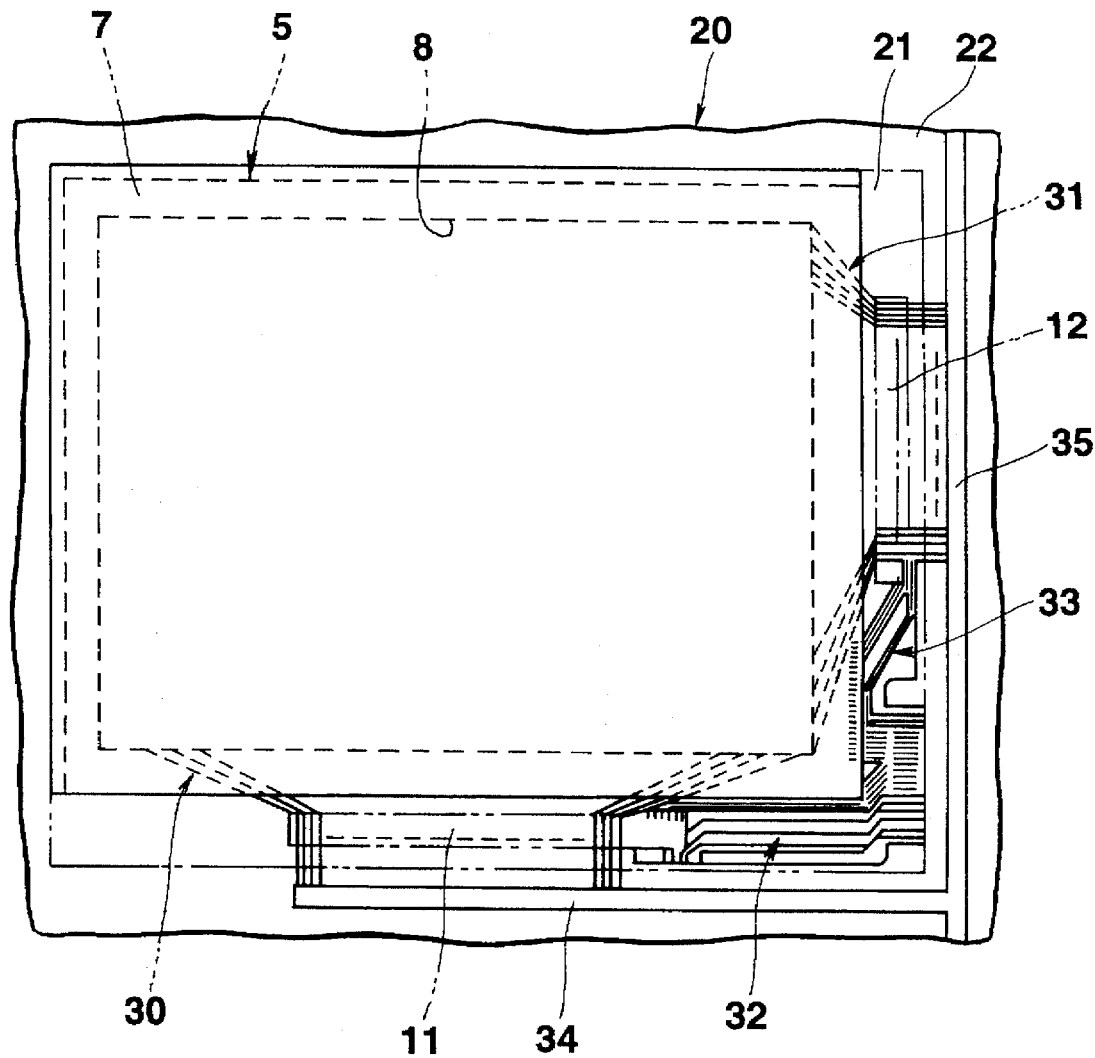
FIG. 2 is a view showing an upper substrate and the part of the lower base plate in the producing process of the present invention, wherein the upper substrate is bonded to the part of the lower base plate by a sealing member.

Thereafter, the upper base plate is cut along an outer peripheral line of the sealing member 7. A portion of the upper base plate, which is located outside of the outer peripheral line of the sealing member 7, is removed. As a result, the upper substrate 5 which is bonded to the lower base plate 20 by the sealing member 7 is formed as shown in FIG. 2.

Then, the lower base plate 20 is cut along a boundary line between the formative portion 21 and the unformative portion 22. At this time, the conductive lines 30 and 31 are also cut along the boundary line so that those conductive lines are disconnected from the connecting patterns 34 and 35. The unformative portion 22 is removed so that the lower substrate 6 is formed. The lower substrate 6 includes portions 9 and 10 (shown in FIG. 3) which are not covered with the upper substrate 5. Thereafter, the liquid crystal material is injected in a cavity defined by the substrates 5 and 6, and the sealing member 7, and is sealed therein. As a result, as shown in FIG. 3, a liquid crystal display panel 40 is completed.

Two semiconductor chips (driving devices) 41 and 42 (shown in FIG. 4) are mounted on the mount areas 11 and 12 of the lower substrate 6 respectively. The semiconductor chips 41 and 42 drive the TFTs. The mount areas 11 and 12 are located in the portions (extended portions) 9 and 10 of the lower substrate 6 respectively. As shown in FIG. 5A, plural input connecting bumps (input terminals) 44 for receiving a control signal and a power source, and plural output connecting bumps (output terminals) 43 for sending a drive signal are formed on a lower surface 47 of the semiconductor chip 41. Similarly, as shown in FIG. 5B, plural input connecting bumps 46 and plural output connecting bumps 45 are formed on a lower surface 48 of the semiconductor chip 42. The bumps 43 and 44 of the semiconductor chip 41 are electrically connected to the conductive lines 30 and 32 respectively through an anisotropic conductive adhesive. The bumps 45 and 46 of the semiconductor chip 42 are electrically connected to the conductive lines 31 and 33 respectively through another anisotropic conductive adhesive.

Figure 4:
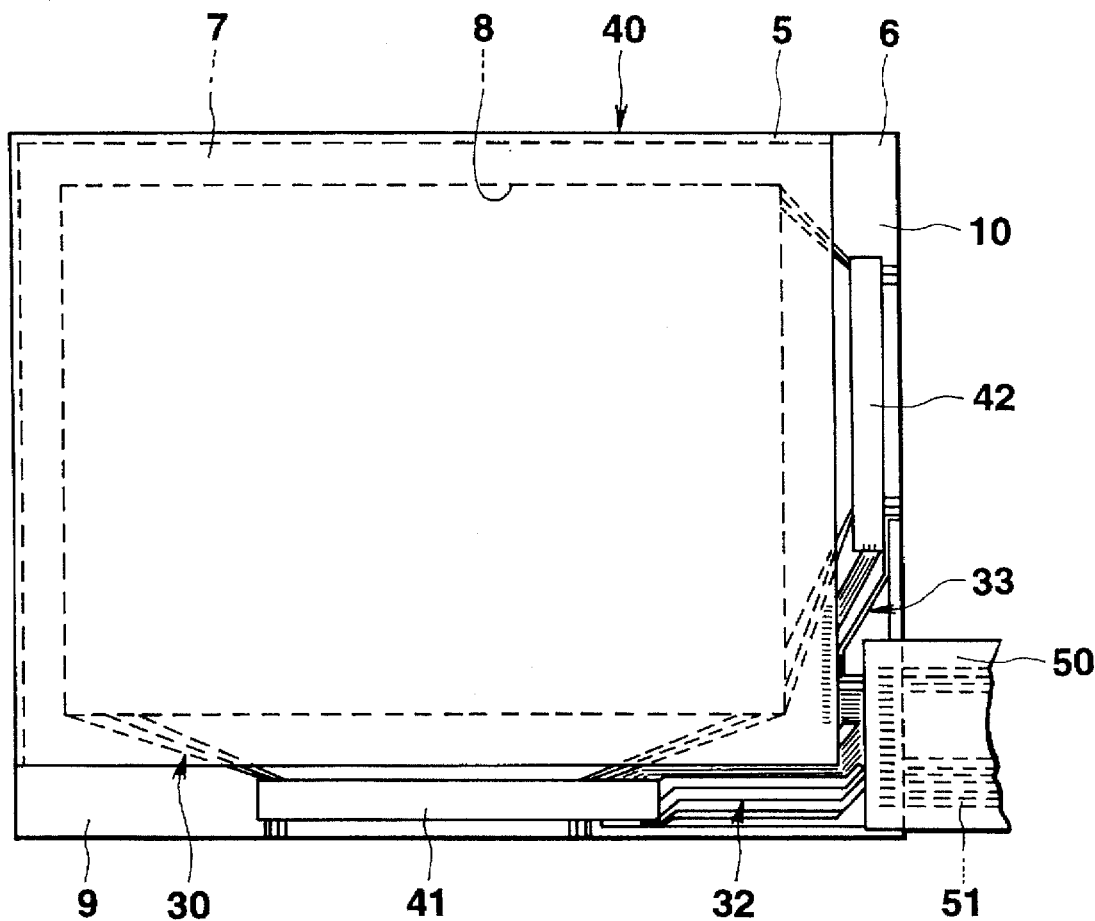
FIG. 4 is a view showing the liquid crystal display device of the present invention, which includes the liquid crystal display panel, two semiconductor chips, and a flexible circuit board.
Figure 5A:
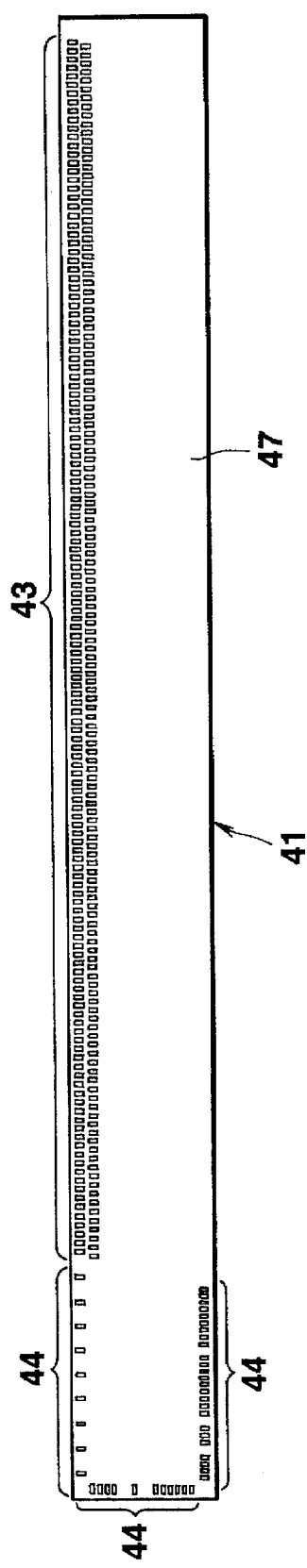
FIG. 5A is a view showing a lower surface of one semiconductor chip in the liquid crystal display device of the present invention.
Figure 5B:
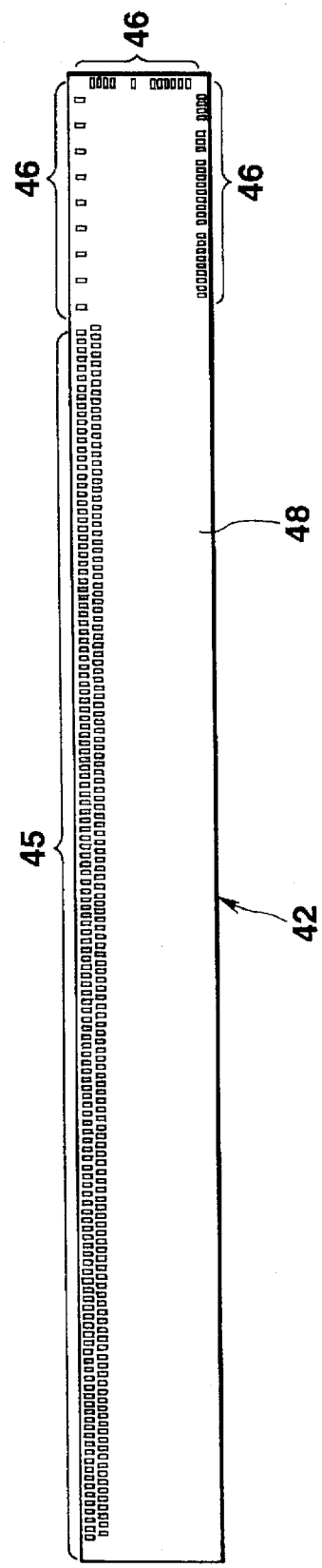
FIG. 5B is a view showing a lower surface of another semiconductor chip in the liquid crystal display device of the present invention.
Figure 6:
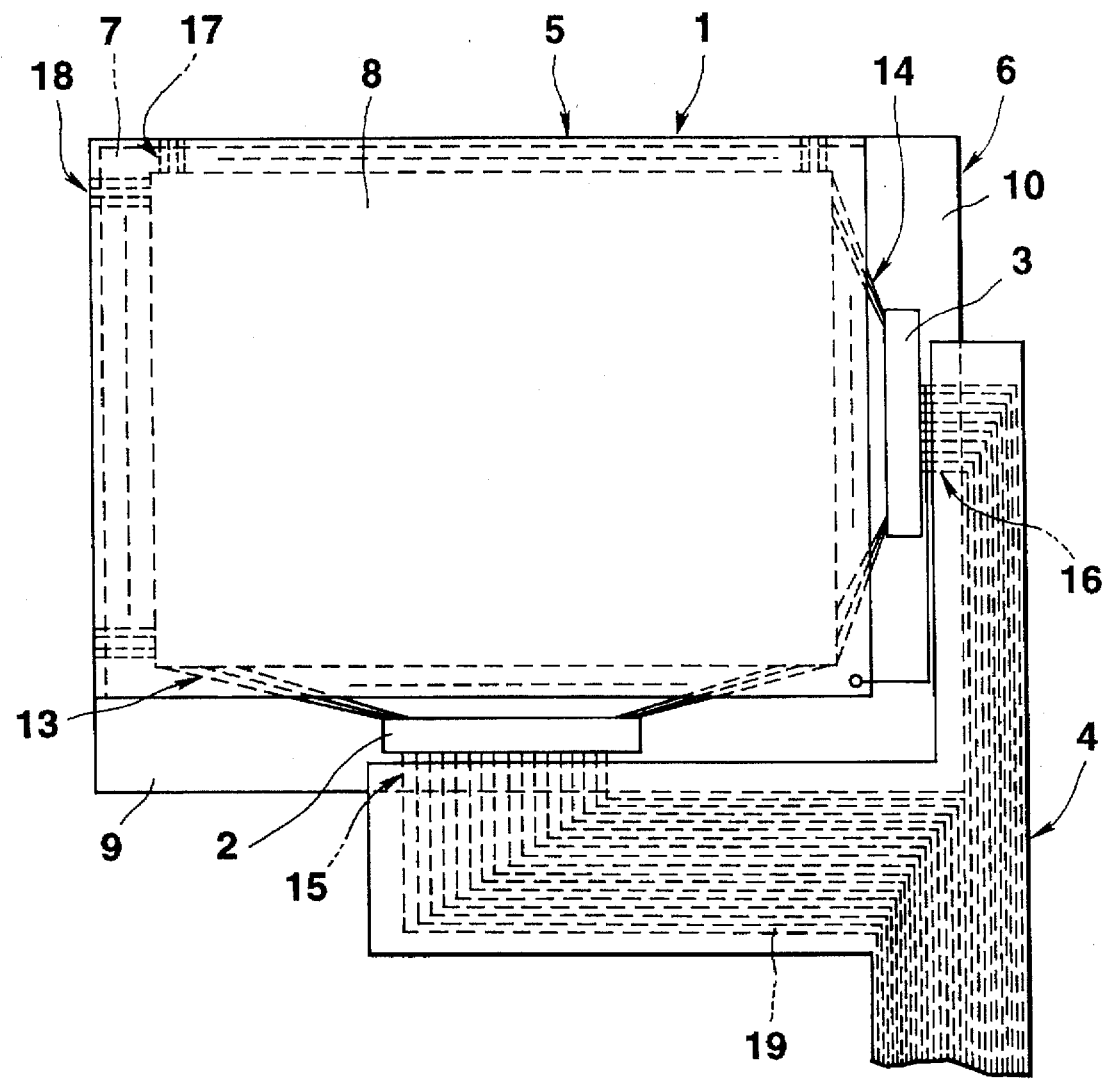
FIG. 6 is a view showing a liquid crystal display device in the prior art.
Figure 7:
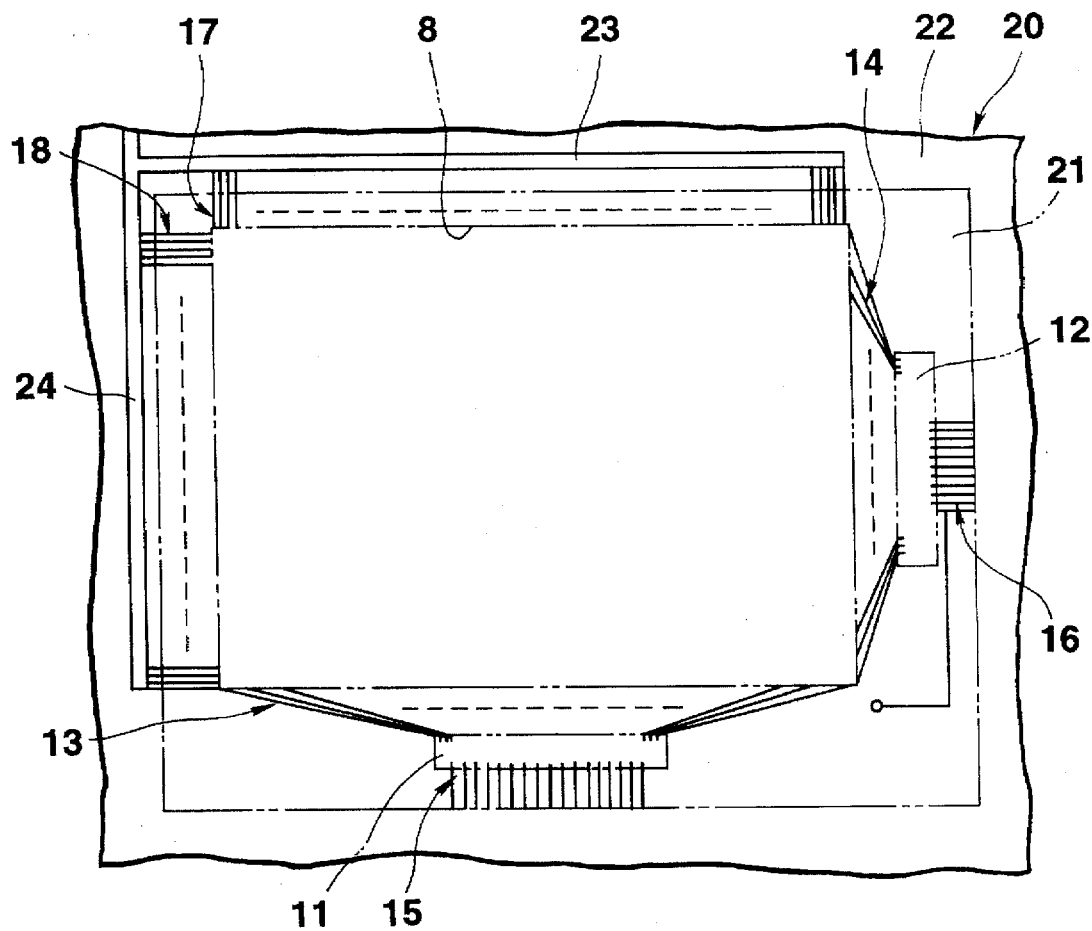
FIG. 7 is a view showing a lower base plate to be subjected to a producing process in the prior art.

A flexible circuit board 50 is linked to the substrate 6 of the liquid crystal display panel 40 so that a liquid crystal display device is completed as shown in FIG. 4. The flexible circuit board 50 is formed into a rectangle. Plural connecting lines 51 are formed on a lower surface of the flexible circuit board 50. First end portions of the connecting lines 51 are electrically connected to the conductive lines 32 and 33 through an anisotropic conductive adhesive. The other end portions of the connecting lines 51 are electrically connected to conductive lines of a control circuit board (not shown).

In the liquid crystal display device described above, the elongated portions of the conductive lines 30 and 31 are formed on the extended portions 9 and 10 of the lower substrate 6 respectively. Therefore, the elongated portions of the conductive lines 30 and 31 are not covered with the upper substrate 5. As a result, foreign matter such as a conductive particle or moisture cannot be held on the elongated portions of the conductive lines 30 and 31. The foreign matter can escape therefrom easily because the foreign matter is not caught between the substrates 5 and 6 at the two edges of the liquid crystal display device.

Further, the end portions of the conductive lines 32 and 33 which are located on the edge of the lower substrate 6 are gathered on the edge of the lower substrate 6 as described above. Therefore, the flexible circuit board 50 is linked to the lower substrate 6 at one portion thereof. The bonding process for linking the flexible circuit board 50 to the lower substrate 6, moreover, is performed only one time. As a result, the productivity of the liquid crystal display device is increased. And it is not needed to form the flexible circuit board 50 into an L-shape. The flexible circuit board 50 can be formed into a rectangle. As a result, the flexible circuit board 50 is made easily and the cost of producing the liquid crystal display device is decreased.

In the above embodiment, the sealing member 7 is arranged on the lower base plate 20. However, the sealing member 7 may be arranged on the upper base plate. Further, the sealing member 7 may be arranged on both the upper base plate and the lower base plate 20.

Several embodiments of the present invention have been described in detail but these embodiments are simply illustrative and not restrictive. The present invention may be modified in various manners. All modifications and applications of the invention of the first portion be within the scope and spirit of the invention, so that the scope of the present invention should be determined only by what is recited in the present appended claims and their equivalents.

What is claimed is:

1. A liquid crystal display device, comprising:
   a first substrate;
   a second substrate arranged to face the first substrate, the second substrate including a first portion which is covered with the first substrate, and a second portion which is not covered with the first substrate;
   a plurality of display elemental devices formed on the first portion of the second substrate;
   a plurality of first conductive lines formed on the second substrate, the first conductive lines each being connected at an end thereof to a respective display elemental device and being elongated from the first portion of the second substrate to an edge of the second substrate through the second portion thereof;
   a plurality of second conductive lines formed on the second portion of the second substrate;
   a driving device having plural output terminals and plural input terminals for driving the display elemental devices, the driving device being mounted on the second portion of the second substrate so that the output terminals and the input terminals thereof are coupled to the first conductive lines and the second conductive lines respectively; and
   a liquid crystal material interposed between the first substrate and the second substrate.

2. A liquid crystal display device according to claim 1, further comprising:
   a circuit board having plural connecting lines, the circuit board being linked to the second portion of the second substrate so that the connecting lines of the circuit board are respectively coupled to the second conductive lines.

3. A liquid crystal display device according to claim 2, wherein portions of the second conductive lines which are coupled to the connecting lines of the circuit board are gathered on the edge of the second substrate.

4. A liquid crystal display device according to claim 3, wherein each of the display elemental devices comprises a thin film transistor.

5. A liquid crystal display device according to claim 4, wherein the driving device comprises a semiconductor chip.

6. A liquid crystal display device according to claim 2, wherein each of the display elemental devices comprises a thin film transistor.

7. A liquid crystal display device according to claim 6, wherein the driving device comprises a semiconductor chip.

8. A liquid crystal display device according to claim 1, wherein each of the display elemental devices comprises a thin film transistor.

9. A liquid crystal display device according to claim 8, wherein the driving device comprises a semiconductor chip.

10. A process for producing a liquid crystal display device including first and second substrates arranged to face each other and a liquid crystal material interposed therebetween, said process comprising the steps of:
    providing a first base plate to be formed into the first substrate;
    providing a second base plate having a first portion to be formed into the second substrate and a second portion, the first portion and the second portion being defined on one surface of the second base plate by a boundary line, and the first portion including a first area to be covered with the first substrate and a second area not to be covered with the first substrate;
    forming a plurality of display elemental devices on the first area of the first portion of the second base plate;
    forming a conductive pattern on the second base plate, the conductive pattern including a connecting pattern and a plurality of conductive lines coupled to the connecting pattern, the connecting pattern being located on the second portion of the second base plate, and the conductive lines being extended from the connecting pattern to the first area of the first portion through the second area of the first portion so as to be connected at ends thereof respectively to the display elemental devices formed on the first area of the first portion;
    forming an orientation film on the first area of the first portion of the second base plate;
    subjecting the orientation film formed on the second base plate to an orientation process such that a surface of the orientation film orients molecules of the liquid crystal material in a predetermined direction;
    arranging a sealing member on at least one of the first base plate and the second base plate, the sealing member forming a frame;
    bonding the first base plate and the second base plate together by means of the sealing member so that the sealing member surrounds the first area of the first portion of the second base plate, wherein a cavity is defined by the first base plate, the second base plate, and the sealing member;
    cutting the first base plate along an outer peripheral line of the sealing member so as to separate the first base plate into two portions by the outer peripheral line, whereby the first substrate is formed;
    cutting the second base plate along the boundary line between the first portion and the second portion thereof so as to separate the first portion from the second portion by the boundary line, whereby the first portion is formed into the second substrate; and
    injecting the liquid crystal material into the cavity defined by the first substrate, the second substrate, and the sealing member.

11. A process according to claim 10, wherein the step of subjecting the orientation film formed on the surface of the second base plate to an orientation process comprises rubbing the surface of the orientation film.

12. A process according to claim 11, wherein the step of subjecting the orientation film formed on the surface of the second base plate to an orientation process comprises earthing the connecting pattern.

13. A process according to claim 12, wherein the step of forming a plurality of display elemental devices comprises forming a thin film transistor as each of the display elemental devices.

14. A process according to claim 13, further comprising the step of:

mounting a driving device on the second portion of the second substrate for driving the display elemental devices.

15. A process according to claim 14, wherein the step of mounting a driving device comprises mounting a semiconductor chip.

16. A process according to claim 10, wherein the step of subjecting the orientation film formed on the surface of the second base plate to an orientation process comprises earthing the connecting pattern.

17. A process according to claim 16, wherein the step of forming a plurality of display elemental devices comprises forming a thin film transistor as each of the display elemental devices.

18. A process according to claim 17, further comprising the step of:

mounting a driving device on the second portion of the second substrate for driving the display elemental devices.

19. A process according to claim 18, wherein the step of mounting a driving device comprises mounting a semiconductor chip.

20. A process for producing a liquid crystal display device including first and second substrates arranged to face each other and a liquid crystal material interposed therebetween, said process comprising the steps of:

providing a first base plate to be formed into the first substrate;

providing a second base plate having a first portion to be formed into the second substrate and a second portion, the first portion and the second portion being defined on one surface of the second base plate by a boundary line, and the first portion including a first area to be covered with the first substrate and a second area not to be covered with the first substrate;

forming a plurality of display elemental devices on the first area of the first portion of the second base plate;

forming a plurality of conductive lines on the second base plate extending from the first area of the first portion to the second portion through the second area of the first portion, the conductive lines being connected at ends thereof respectively to the display elemental devices;

forming a connecting pattern on the second portion of the second base plate, the connecting pattern being coupled to each of the conductive lines;

forming an orientation film on the first area of the first portion of the second base plate;

subjecting the orientation film formed on the second base plate to an orientation process such that a surface of the orientation film orients molecules of the liquid crystal material in a predetermined direction;

arranging a sealing member on at least one of the first base plate and the second base plate, the sealing member forming a frame;

bonding the first base plate and the second base plate together by means of the sealing member so that the sealing member surrounds the first area of the first portion of the second base plate, wherein a cavity is defined by the first base plate, the second base plate, and the sealing member;

cutting the first base plate along an outer peripheral line of the sealing member so as to separate the first base plate into two portions by the outer peripheral line, whereby the first substrate is formed;

cutting the second base plate along the boundary line between the first portion and the second portion thereof so as to separate the first portion from the second portion by the boundary line, whereby the first portion is formed into the second substrate; and injecting the liquid crystal material into the cavity defined by the first substrate, the second substrate, and the sealing member.

21. A process according to claim 20, wherein the step of subjecting the orientation film formed on the surface of the second base plate to an orientation process comprises rubbing the surface of the orientation film.

22. A process according to claim 21, wherein the step of subjecting the orientation film formed on the surface of the second base plate to an orientation process comprises earthing the connecting pattern.

23. A process according to claim 22, wherein the step of forming a plurality of display elemental devices comprises forming a thin film transistor as each of the display elemental devices.

24. A process according to claim 23, further comprising the step of:

mounting a driving device on the second portion of the second substrate for driving the display elemental devices.

25. A process according to claim 24, wherein the step of mounting a driving device comprises mounting a semiconductor chip.

26. A process according to claim 20, wherein the step of subjecting the orientation film formed on the surface of the second base plate to an orientation process comprises earthing the connecting pattern.

27. A process according to claim 26, wherein the step of forming a plurality of display elemental devices comprises forming a thin film transistor as each of the display elemental devices.

28. A process according to claim 27, further comprising the step of:

mounting a driving device on the second portion of the second substrate for driving the display elemental devices.

29. A process according to claim 28, wherein the step of mounting a driving device comprises mounting a semiconductor chip.

* * * * *